United States Patent [19]

Adams

[11] Patent Number: 4,790,076
[45] Date of Patent: Dec. 13, 1988

[54] INSTRUMENT RESPONSIVE TO ACCELERATION FORCES

[76] Inventor: Eric M. Adams, 9222 S.W. 5th St. Apt. C, Boca Raton, Fla. 33428

[21] Appl. No.: 934,894

[22] Filed: Nov. 25, 1986

[51] Int. Cl.⁴ ............................................. G01P 15/11
[52] U.S. Cl. .................................... 33/365; 73/517 R
[58] Field of Search ....................... 73/517 R, 516 R; 33/365; 324/208, 207

[56] References Cited

U.S. PATENT DOCUMENTS

| | | | |
|---|---|---|---|
| 2,168,885 | 8/1939 | Rickenbach et al. | 33/365 |
| 2,205,544 | 6/1940 | Rylsky | 33/365 |
| 3,877,314 | 4/1975 | Bernin | 73/517 B |
| 4,365,513 | 12/1982 | Iwasaki | 73/517 P |
| 4,498,341 | 2/1985 | Breitbach et al. | 73/517 R |

*Primary Examiner*—William D. Martin, Jr.
*Attorney, Agent, or Firm*—James B. Hinson

[57] ABSTRACT

The invention provides an instrument responsive to acceleration forces. In the preferred embodiment, a body of magnetic material is positioned in a cavity such that it moves to a central position in response to a magnetic field and moves along a preselected path in response to acceleration forces. Means is included permitting the position of the body of magnetic material to be determined. The position of the body of magnetic material relative to the structure of the instrument is an indication of the acceleration force applied to the instrument.

5 Claims, 1 Drawing Sheet

VIEW A-A

VIEW A-A

INSTRUMENT RESPONSIVE TO ACCELERATION FORCES

BACKGROUND OF THE INVENTION

1. Field of the Invention

The invention relates to instruments for detecting forces and more specifically to an instrument for detecting a component of a force with respect to an axis using a body of magnetic material whose position in a cavity changes in response to a force to which the instrument is subjected.

2. Description of the Prior Art

A prior art patent search was conducted prior to preparing this patent application. This search was directed primarily to the location of instruments responsive to changes in a force to which the instrument is subjected with respect to a predetermined axis. Such instruments take many forms, the carpenter's level being an example as applied to the force of gravity.

This search failed to reveal any instruments performing this basic function utilizing magnetic techniques. However, the following prior art patents illustrate various applications of magnetic devices and techniques.

Devices in which a body of magnetic material is suspended in a cavity by a magnetic field are illustrated in U. S. Pat. No. 4,473,259. This patent also illustrates the use of a control system to adjust magnetic fields to maintain the body of magnetic material at the desired location within the cavity. In the specific embodiment the device is used as a bearing with a rotating shaft suspended such that is does not mechanically contact any portion of the structure.

Devices for magnetically suspending bodies of magnetic materials are further illustrated in U.S. Pat. No. 4,273,054. The apparatus illustrated in this patent is primarily intended for use in levitating railroad cars. Magnetically levitated railroad cars are further illustrated in U.S Pat. No. 4,356,772. In addition to illustrating magnetic levitation, this patent illustrates methods and apparatus for damping oscillations in the levitated train.

SUMMARY OF THE INVENTION

Acceleration or more specifically, acceleration forces, as used in this patent application means the force of gravity, forces due changes in the velocity of a body or both. The instrument which is the subject of this patent application responds to all acceleration forces as more specifically discussed below.

The preferred embodiment of the invention includes a supporting structure having an outer portion surrounding a cavity therein. Apparatus is provided for establishing a magnetic field in the cavity. A body of magnetic material is supported in the cavity such that the body of material tends to move to a preselected position along a predetermined path in response to the magnetic field within the cavity and changes position in response to acceleration forces. Apparatus is provided to indicate the position of the body of magnetic material with respect to the predetermined path along which it moves. The position of the body of magnetic material relative to the path along which it moves is an indication of the component of the applied acceleration force with respect to a predetermined axis. Support for the body of magnetic material is provided by a spindle which moves on opposed rails and along a predetermined path within the cavity.

OBJECTS OF THE INVENTION

It is the principal object of the invention to provide a new and improved instrument responsive to acceleration forces.

It is another object of the invention to provide an instrument useful as a carpenter's level using magnetic techniques.

It is another object of the invention to provide a carpenter's level in which the level indicating instrument is replaceable.

It is also an object of the invention to provide an instrument capable of indicating the orientation of an object with respect to an axis of rotation.

DETAILED DESCRIPTION

The instrument which is the subject of this invention is intended to have wide range of application. For example it is especially useful in environments where a mechanically durable carpenter's level is desired. It is equally adaptable to uses in which an instrument is desired to measure the angular orientation of an object with respect to an axis of rotation. Other possible uses include systems to determine the orientation of aircraft with respect to the horizion. The novel features of the invention are discussed more fully below with reference to a preferred embodiment of the invention.

Figure 1:
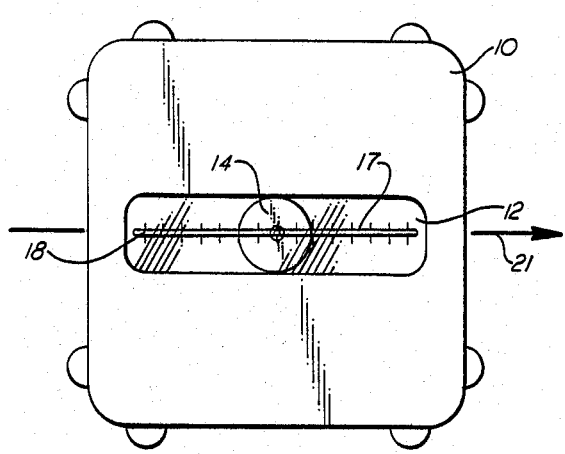
FIG. 1 is a front view of the instrument comprising the preferred embodiement of the invention.

FIG. 1 is a front view of the acceleration responsive instrument comprising the preferred embodiment of the invention. Since the instrument is symmetrical about its major axis 21, this front view is also representative of the back view.

Figure 2:
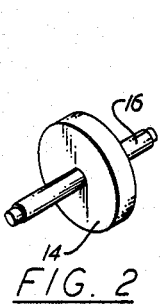
FIG. 2 is a drawing illustrating the movable element used in the preferred embodiment of the invention.

The preferred embodiment of the instrument includes a supporting structure 10, which has an outer portion surrounding a cavity 12. A body of magnetic material 14 is supported within the cavity 12. The body of magnetic material 14 (FIG. 2) is generally disc-like in shape and is supported on a spindle 16 having opposed ends of a smaller diameter. Opposed ends of the spindle 16 mate with two slots or tracks 18 and 19 in the front and back plates 22 and 24. The tracks 18 and 19 are positioned parallel to the center line 21 of the instrument. Front and back transparent plates 22 and 24 mate with the supporting structure 10 and with the ends of the spindle 16.

The supporting structure 10 may be made as two mirror image halves divided along axis 11. Such construction simplifies assembly of the instrument. Any convenient means may be utilized to hold the components of the instrument in the assembled position, as illustrated.

In the preferred embodiment, the front and back plates 22 and 24 are made of transparent material and include a scale 17 permitting the position of the body of magnetic material 14 along the tracks 18 and 19 to be visually determined. Two permanent magnets, 26 and 28, are positioned substantially symmetric with respect to the cavity 12 to form a magnetic field therein. These magnets are polarized along their short dimension (i.e. transverse to the center line 21 of the instrument) with like poles of magnets 26 and 28 positioned adjacent the front portion of the supporting structure 10.

Figure 3:
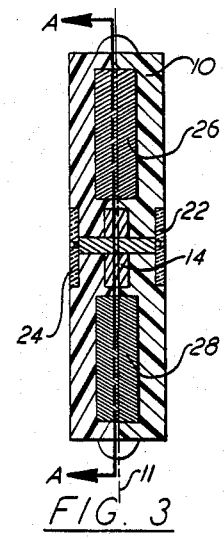
FIG. 3 is a cross sectional drawing of the instrument comprising the preferred embodiment of the invention.
Figure 4:
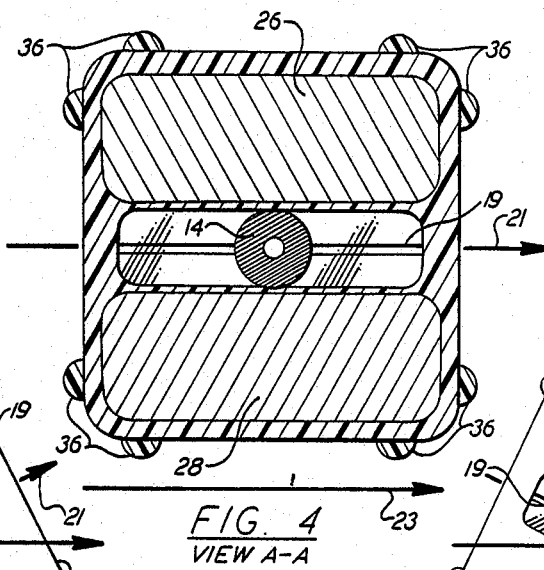
FIG. 4 is a cross section drawing of the instrument comprising the preferred embodiment of the invention.

FIGS. 3, and 4 are cross sectional views of the embodiment of the invention illustrated in FIG. 1. In FIG. 4 the instrument is positioned such that the center line 21 and the channels 18 and 19 are substantially parallel to the horizontal axis 23. In this orientation and in the absence of an acceleration force the magnetic fields created by permanent magnets 26 and 28 causes the body of magnetic material 14 to move to the central portion of the instrument, as illustrated in FIGS. 1 and 4.

Figure 5:
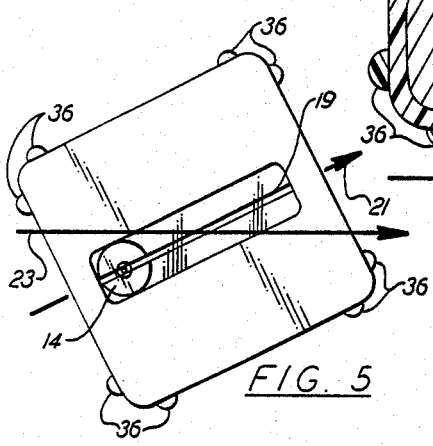
FIG. 5 is a drawing illustrating the instrument comprising the invention inclined at a first angle.

FIG. 5 is also a view of the instrument illustrated in FIG. 1 oriented such that center line 21 is inclined with respect to the horizontal axis 23. In this orientation of the instrument the body of magnetic material 14 moves to the left along the channels 18 and 19 to a position illustrated in FIG. 5. The amount of movement of the body of magnetic material 14 depends on the degree of inclination of the instrument with respect to the horizontal axis 23 as well as the detailed design of the instrument. FIG. 5, being only an example to illustrate that in this orientation, the body of magnetic material 14 moves away from its central position under the influence of gravity (one example of an acceleration force) thereby indicating that the instrument is inclined with respect to the horizontal axis 23.

Figure 6:
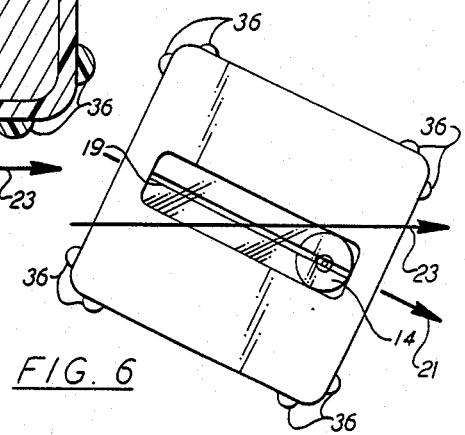
FIG. 6 is a drawing illustrating the instrument comprising the invention inclined at a second angle.

FIG. 6 is a second view of the embodiment of the invention illustrated in FIG. 1 inclined at a second angle with respect to the horizontal axis 23. In this view, the body of magnetic material 14 moves to the right of its central position indicating that the instrument is inclined with respect to the horizontal axis 23. As with FIG. 5, the amount of movement of the body of magnetic material 14 depends on the detailed design of the instrument and the degree of inclination of the instrument with respect to the horizontal axis 23. This figure being an example to illustrate that in this orientation of the instrument the body of magnetic material 14 moves to the right under the influence of gravity.

Many modifications of the preferred embodiment illustrated in the drawings and discussed above are possible without departing from the principles of the invention. It is contemplated that the tracks supporting the body of magnetic material 14 may be curved, for example, segments of circles. Although the body of magnetic material 14 is illustrated as being circular, other suitable shapes are also believed to be usable. Various techniques, including electrical sensors, can be used to detect the position of the body of magnetic material 14 along the supporting tracks.

Figure 7:
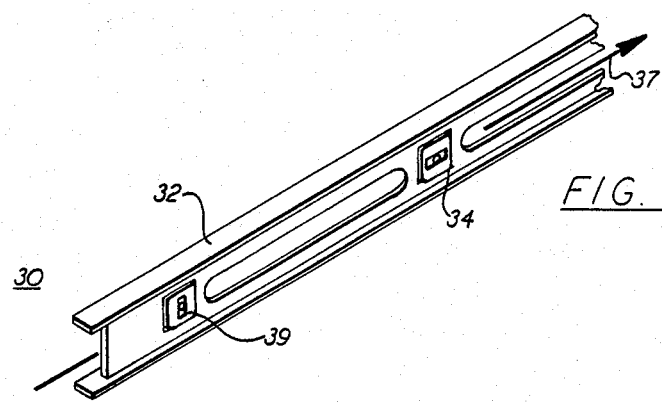
FIG. 7 is a drawing illustrating the instrument comprising the preferred embodiment of the invention used as an indicator of a carpenter's level.

FIG. 7 illustrates the application of the invention to adapt it for use as an indicator in a carpenter's level 30. The level 30 utilizes two instruments of the type discussed above. This embodiment includes a generally "I" shaped beam 32, which serves as the body of the level. One of the instruments 34 is mounted such that its center line 21 is parallel to the major axis 37 of the generally "I" shaped member 32. The second instrument 36 is mounted such that its center line 21 is perpendicular to the major axis 37. This provides means for the level 30 to be used to detect when structures are in either the horizontal or vertical orientation. For example, when the "I" shaped beam 30 is horizontal, the movable body of magnetic material 14 associated with the first instrument 34 will be in its central position, as illustrated in FIG. 1. Similarly, the second instrument, 39 is used to determine when structures are vertical with the vertical position corresponding to a central orientation of the movable body of magnetic material 14 in the second instrument 39.

Outwardly extending alignment and latching members 36 are provided on each edge of the instrument. Selected ones of these members may be spring loaded such that the latches can be depressed permitting the instrument to be slid transversely into a suitable mount which includes depressions which cooperate with the latches 36 to hold the instrument in the desired position relative to the mount.

Although the instrument illustrated in reference numeral 10 has been described and discussed above with respect to its use as a carpenter's level, it will be appreciated by those skilled in the art that the same basic instrument may be used in other applications. The instrument may be used to measure accelerations producing changes in speed, provided the change in speed has a component parallel to the horizontal axis 21 of the instrument. For example, if the instrument 10 is moving and experiences a change in speed along a path parallel to its axis 21 and 18, the position of the movable body of magnetic material 14 will change relative to the remainder of the instrument. The magnitude of the acceleration determines the displacement of the body of magnetic material 14 from its central position. Changes in other directions will also effect the position of the body of magnetic material 14 with the degree of movement being effected by the magnitude and direction of the force vector relative to the channels 18 and 19 with the instrument being more sensitive to forces parallel to these channels and essentially insensitive to changes in motion perpendicular to these channels. These characteristics permit the instrument, represented in reference numeral 10, to be used in other applications, such as those previously discussed.

For measuring accelerations producing changes in speed when the direction of the speed changes is not known, three instruments of the type discussed above oriented perpendicular to each other can be used.

Individual vectors are used to represent the displacement of the body of magnetic material 14 associated with each instrument. The vectors are added to arrive at a magnitude and direction of the applied accelerative force.

I claim:
1. An instrument responsive to acceleration forces, comprising in combination:
(a) a body of magnetic material;
(b) spindle means adapted to support said body of magnetic material
(c) a supporting structure having an outer perimeter and a cavity therein, said supporting structure also including channel means adapted to cooperate with said spindle means to support said body of magnetic material in said cavity such that said body of magnetic material is selectively movable along predetermined paths defined by said channel means;

(d) magnetic means affixed to said supporting structure and adapted to produce a magnetic field in said cavity such that the position of said body magnetic material has a predetermined relationship to said magnetic field and the acceleration forces to which said instrument is subjected such that said body of magnetic material changes positions as said acceleration forces vary.

2. An instrument responsive to acceleration forces comprising in combination:

(a) a supporting structure having an outer perimeter and a cavity therein;

(b) first means for providing a magnetic field in said cavity, said first means including first and second permanent magnets positioned on opposed sides of said cavity;

(c) a body of magnetic material;

(d) a spindle having first and second ends and adapted to support said body of magnetic material;

(e) second means for supporting said body of magnetic material within said cavity, said second means including first and second channels supported on opposite sides of said cavity, said channels being adapted to mate with said first and second ends of said spindle such that said body of magnetic material moves in a predetermined manner within said cavity in response to acceleration forces.

3. An instrument in accordance with claim 2 further including means for determining the position of said body of magnetic material relative to its central position.

4. An instrument responsive to acceleration forces in accordance with claim 1 wherein said magnetic means includes first and second permanent magnets positioned transverse to said support channels.

5. An instrument responsive to acceleration forces in accordance with claim 4 wherein said spindle extends transversely through said body of magnetic material and includes opposed ends which mate with said channels.

* * * * *